Patented June 16, 1931

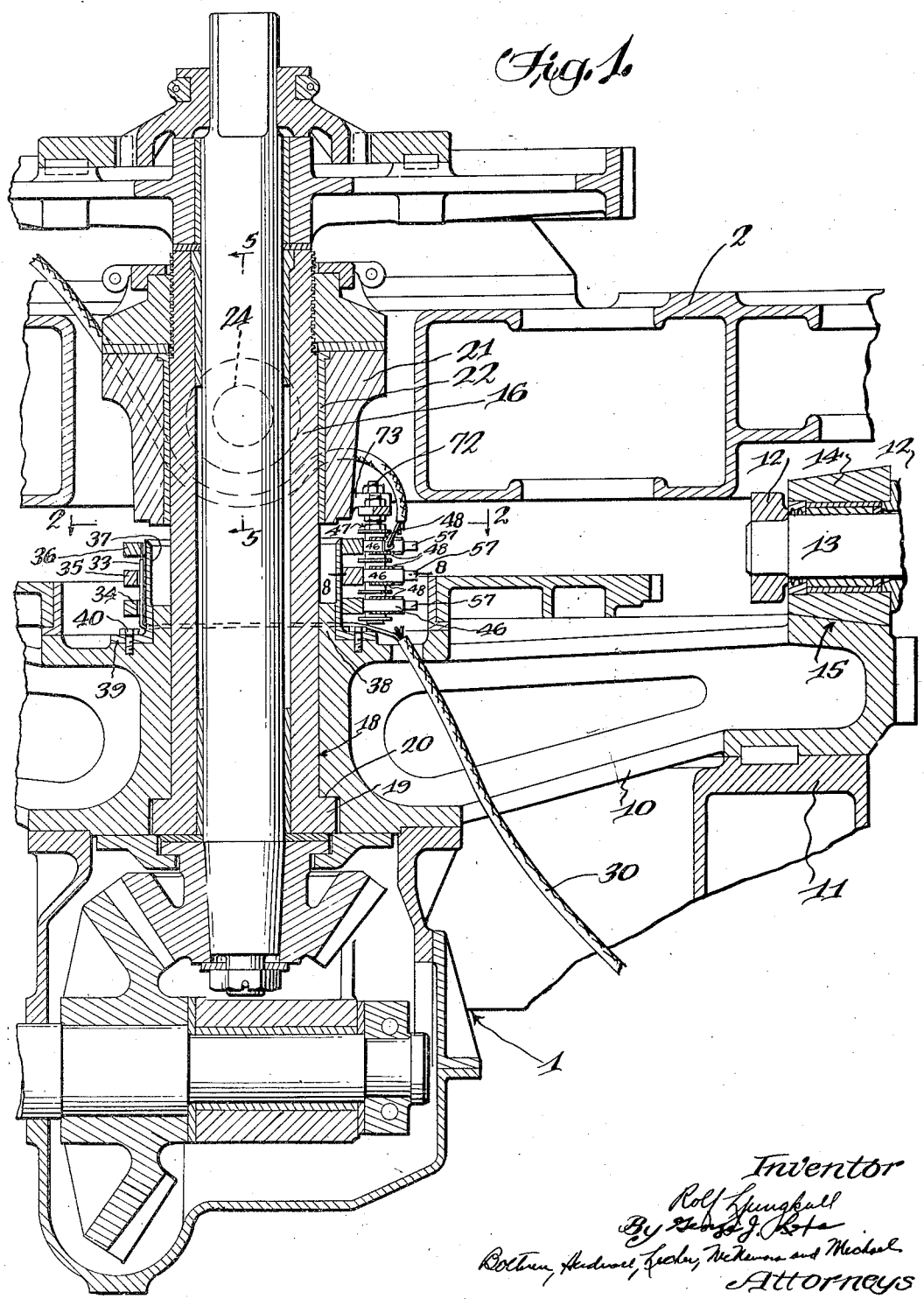

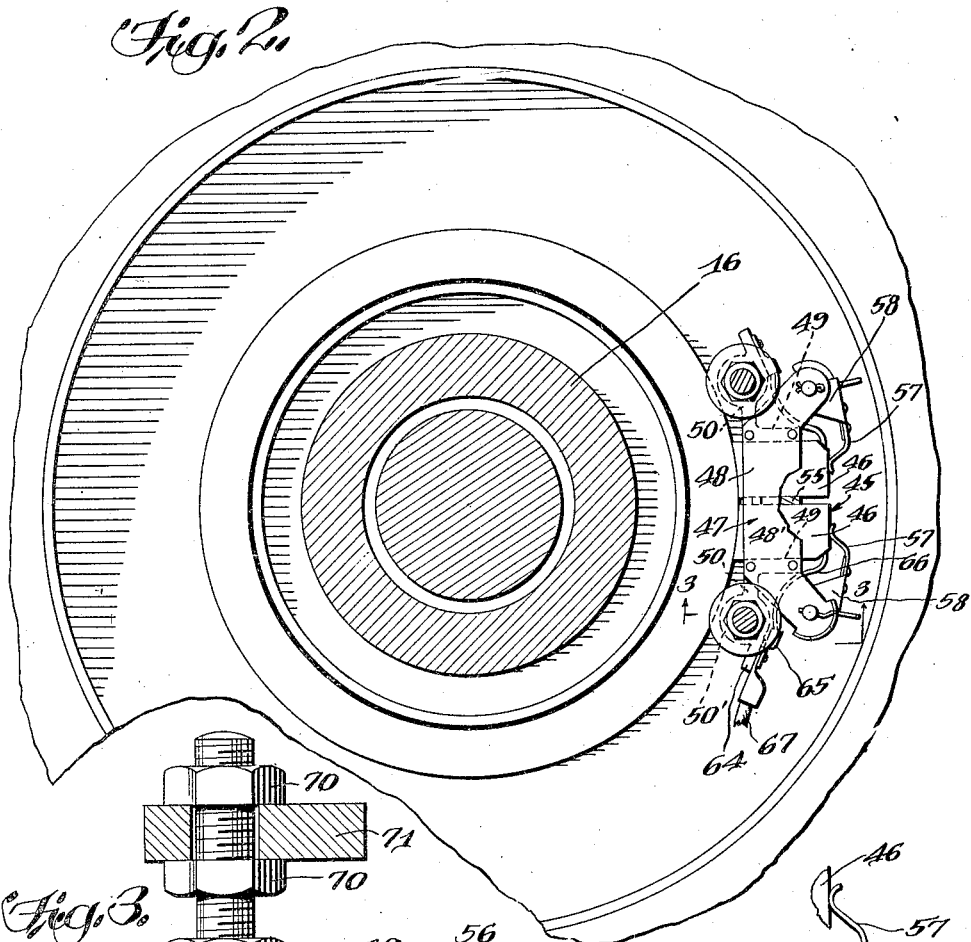
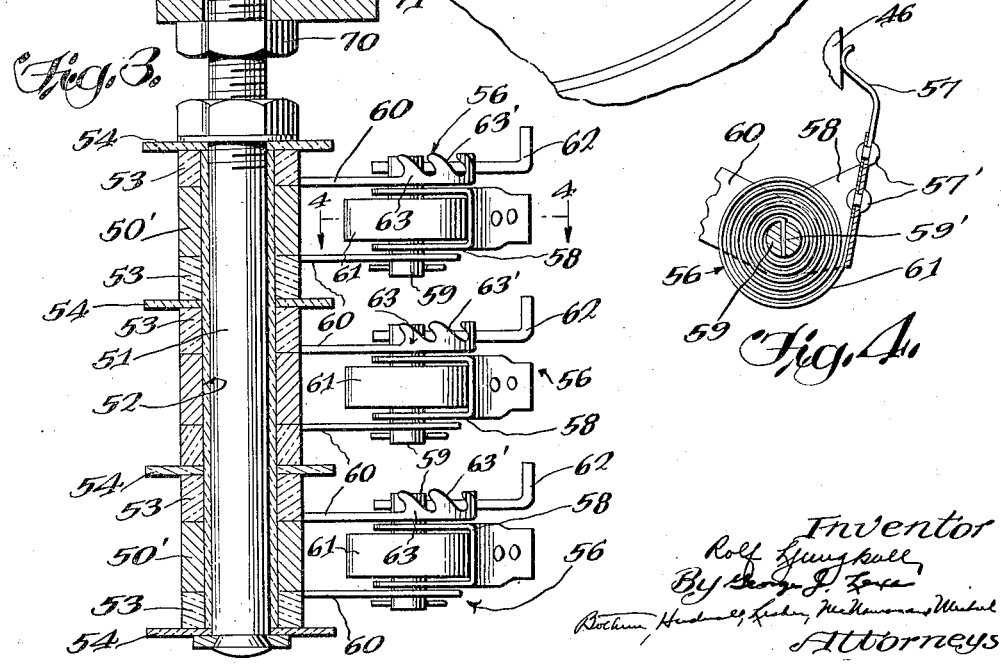

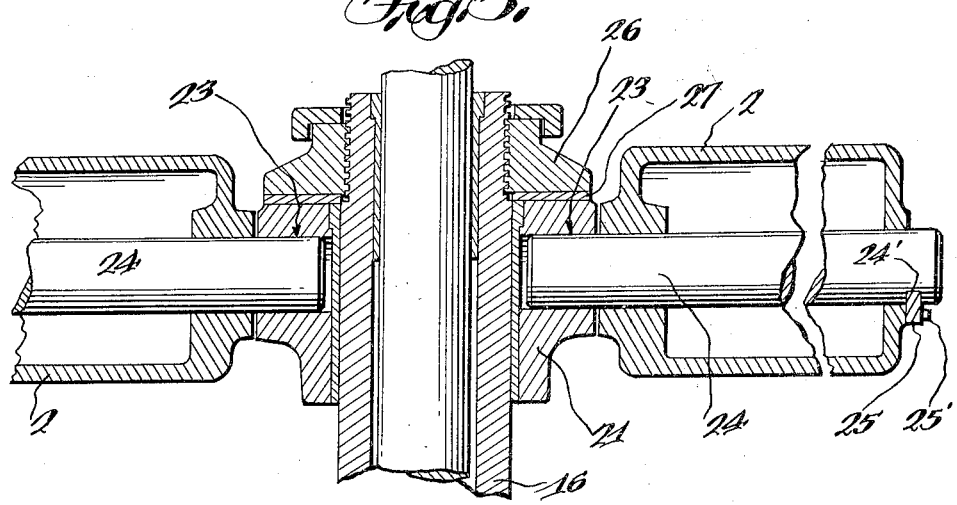
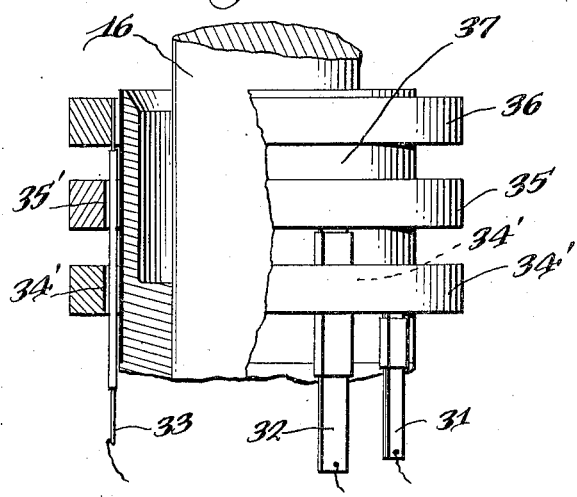
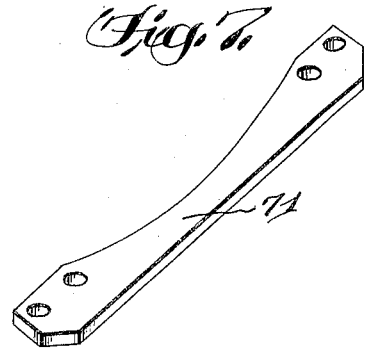
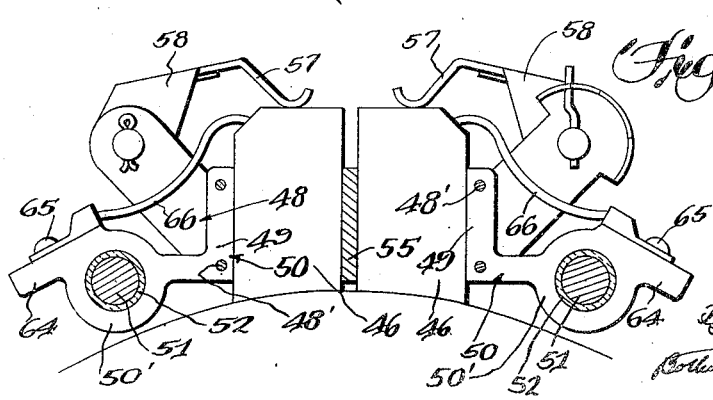

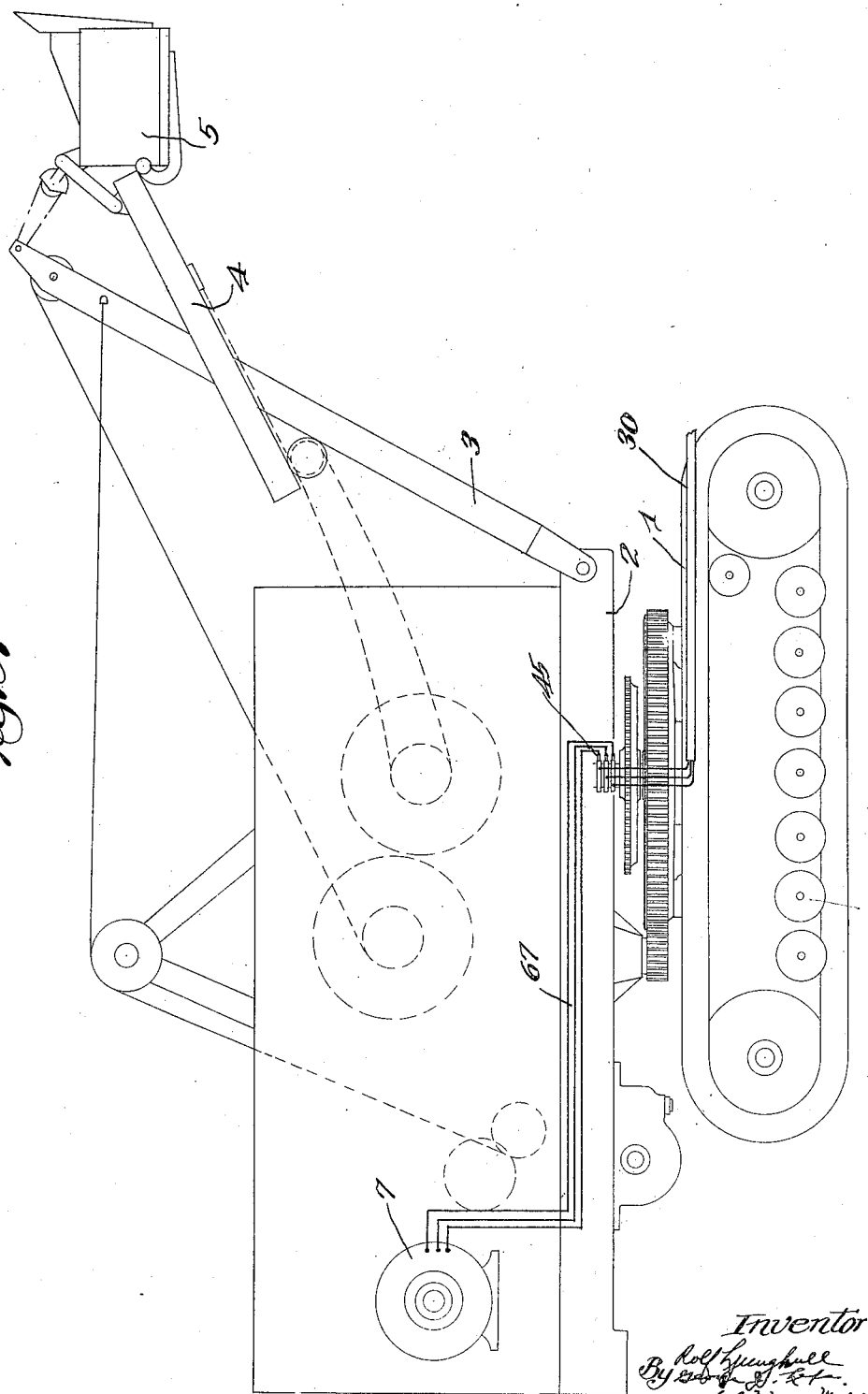

1,809,981

UNITED STATES PATENT OFFICE

GEORGE J. LEXA AND ROLF LJUNGKULL, OF WAUWATOSA, WISCONSIN, ASSIGNORS TO HARNISCHFEGER CORPORATION, OF MILWAUKEE, WISCONSIN, A CORPORATION OF WISCONSIN

ELECTRIC MOTOR DRIVEN EXCAVATING MACHINERY

Application filed September 18, 1929. Serial No. 393,563.

This invention relates in general to excavating or handling machinery such as power shovels, hoes, drag lines, clam shells, cranes and the like and more particularly to machinery of this character which is adapted to utilize an electric motor for driving the various instrumentalities of the machine.

One of the principal objects of the present invention is to provide a simple, durable and reliable means for transmitting the electric current from the truck of the machine to the revolving platform on which the electric motor is mounted.

Machines of this character generally include a truck equipped with endless flexible treads or traction devices and supporting a revolvable platform carrying the boom, the power plant and the other instrumentalities of the machine. Operation of the machine requires that the platform carrying the boom be revolved. Where the power plant of the machine is in the form of an electric motor, the necessity of turning or revolving the platform makes it impractical to carry the supply conductors directly to the revolving platform or to the motor thereon. Hence it has been the practice in prior machines of this character to carry the supply conductors to the truck and then provide some means for transmitting the current from the truck to the motor on the revolving platform. The means heretofore proposed for this purpose have not proven satisfactory and have been a source of serious difficulty and annoyance in that their operation has been unreliable, inefficient and subject to rather frequent breakdowns, necessitating frequent repairs and replacements. The problem of properly transferring the current from the truck to the revolving platform is aggravated not only by reason of the turning of the platform relative to the truck but also because of the irregular tipping or rocking of the platform longitudinally, which occurs when the boom carried by the platform is subjected to or relieved of load. For instance, when a shovel or a bucket is forced into the earth the boom and platform are frequently subjected to a sudden and rather heavy shock or strain which tends to and to some extent does tip or rock the revolving platform in the plane of its longitudinal axis.

The present invention provides a novel form of collector ring and brush arrangement for transferring the current from the supply conductors on the truck to the motor on the revolving platform and so organizes the truck and platform with each other and with the collector ring and brush arrangement as to relieve the collector ring and brush arrangement of any of the forces or stresses set up by the tipping or rocking of the platform. In other words, irrespective of the turning of the platform or of the tipping thereof the coaction of the collector ring and brush arrangement is unimpaired and is always operative to efficiently transmit the current from the supply conductors to the motor on the revolving platform.

Another object of the invention resides in the provision of a device having these advantages and capacities and which is simple and durable in construction, reliable and efficient in operation, readily accessible and easy and comparatively inexpensive to manufacture and install.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a fragmentary view in longitudinal vertical section, illustrating the mounting of the revolving platform on the truck and the manner of organizing the collector ring and brush arrangement with the truck and platform, parts being shown in elevation for the sake of simplicity in illustration;

Figure 2 is a fragmentary view in horizontal section taken on line 2—2 of Figure 1;

Figure 3 is a view in vertical section taken on line 3—3 of Figure 2;

Figure 4 is a detail sectional view taken on line 4—4 of Figure 3;

Figure 5 is a fragmentary view in vertical section taken in the plane of line 5—5 of Figure 1 and looking in the direction of the arrows;

Figure 6 is a fragmentary detail view partly in section and partly in elevation illustrating the manner of connecting the supply conductors to the collector rings;

Figure 7 is a detail perspective view of one of the parts of the brush arrangement;

Figure 8 is a view of the brush assembly in horizontal section taken on line 8—8 of Figure 1; and Figure 9 is a diagrammatic view in elevation illustrating the general construction of the machine and the location of the means for transmitting the current from the truck to the motor on the revolving platform.

Referring to the drawings, more especially to Figure 9, the excavating machine is shown as having the usual traveling truck 1 supporting a revolvable platform 2 on which a boom 3 is carried. The machine shown in Figure 9 is a power shovel and consequently the boom carries a dipper stick 4 on which the bucket 5 is supported. The means for raising and lowering the boom, for hoisting the dipper stick, for imparting a crowding motion thereto, and the various other instrumentalities are illustrated only diagrammatically as they are well known and per se form no part of the present invention. These various instrumentalities are driven in the usual manner by a power plant mounted on the platform 2 and shown as comprising an electric motor 7.

As illustrated in Figure 1 and in accordance with the usual practice, a combined swing gear and roller path 10 is fixedly keyed and secured to the frame 11 of the traveling truck 1. The revolving platform 2 has integral bearing brackets 12 in which pins 13 are carried, the pins 13 supporting rollers 14 which travel on the track 15 of the combined swing gear and roller path 10 thereby supporting the platform 2 for turning movement on the truck 1.

In order to tie the platform 2 to the truck 1 at the center of the machine and yet permit of rotation of the platform, a hollow gudgeon pin or sleeve 16 is provided and extends through an opening 18 formed in the center of the combined swing gear and roller path 10. At its lower end the gudgeon pin or sleeve 16 has an outwardly directed flange 19 which engages beneath a shoulder 20 provided on the combined swing gear and roller path 10. The upper end of the hollow gudgeon pin 16 extends through and is rotatably fitted in a heavy bearing collar 21, the collar 21 being lined by a bushing 22. The bearing collar 21 is rockably or pivotally interconnected with the revolving platform 2. Thus, as shown in Figure 5 the bearing collar 21 has diagrammatically opposite bearing openings 23 into which the inner ends of supporting pins or trunnions 24 are fitted, the trunnions 24 being mounted in bearing openings provided therefor in the platform 2 and being secured in position by retainer plates 25 releasably fastened to the platform 2 by stud bolts 25' and fitted in notches 24' provided in the outer ends of the pins 24. A cap or nut 26 is threaded on the upper end of the hollow gudgeon pin and bears on a washer 27 interposed between the under side of the cap or nut 26 and the upper end of the collar 21. In this way the gudgeon pin 16 provides a tension bridge or tie member between the revolving platform 2 and the truck 1 without interfering with the freedom of the platform 2 to revolve and while permitting the platform 2 to tip or rock slightly in the plane of its longitudinal axis without transmitting this tipping or rocking to the gudgeon pin or to its bearing collar. The purpose of providing the tie member or tension bridge between the center of the platform and the truck is to enable the weight of the truck to be utilized in stabilizing the machine.

The means provided for supplying current to the electric motor 7 consists of a supply cable 30 which extends up to the truck 1 and has its several insulated conductors electrically connected to insulated copper bars 31, 32 and 33, these bars being soldered, welded or otherwise suitably attached to collector rings 34, 35 and 36 respectively (see Figure 6). The rings are internally notched or slotted at the point where they are connected to their respective bars and the ring 34 also has two angularly spaced slots 34', one to permit of the passage of the insulated portion of the bar 32 therethrough and the other to accommodate a portion of the insulated conductor bar 33. The conductor bar 33 after passing through its slot or notch 34' of the ring 24 extends upwardly through an aligned and similar slot 35' in the ring 35 and thence to the point of its attachment to the upper collector ring 36. As shown in Figures 1 and 6, the collector rings 34, 35 and 36 are shrunk or otherwise suitably fixed on a mounting sleeve 37 which surrounds a reduced extension 38 of the combined swing gear and roller path 10 and which has its flange 39 fastened thereto by stud bolts 40.

A brush assembly designated generally at 45 is carried by the bearing collar 21 and coacts with the collector rings 34, 35 and 36. This brush assembly includes a pair of brushes 46 for each collector ring, each pair of brushes being slidably fitted in a guideway provided therefor in the brush mounting designated generally at 47 (compare Figures 1, 2 and 8). The brush mounting 47 consists of three pairs of spaced horizontally disposed plates 48. In between the ends of the members of each pair of plates 48, the lugs 49 of brackets designated generally at 50 are fitted, the lugs being riveted to the plates 48 as at 48'. The brackets 50 have apertured portions 50' which are carried by a supporting bolt 51 (compare Figures 3 and 8). The several brackets 50 are insulated from the supporting bolt 51 by means of an insulating sleeve 52 interposed between the apertured portions of the brackets and the bolts and are insulated from each other by means of insulating collars 53 and insulating washers 54. The lugs 49 of the brackets 50 provide not only for the mounting or supporting of the plates 48, but also provide one wall of the guide afforded for each brush 46 (see Figure 8). The other wall of the guide for each brush is afforded by a partition 55 common to the members of each pair of brushes and suitably secured to the members of the pair of plates 48 with which it is associated (compare Figures 2 and 8). The brushes 46 are biased or yieldably urged into engagement with their respective collector rings by individual tensioning devices or brush biasing devices designated generally at 56. Each device 56 includes a resilient finger 57 having one end bearing against its brush 46 and having its other end integral with a carrier 58 freely pivoted on a pin 59 supported for rotary movement in extensions 60 of the plates 48. A coil spring 61 is provided and has one end riveted as at 57' to the carrier 58 and has its other end anchored in a diametrical slot 59' provided in the pin 59. The spring 61 is under tension and tends to press the finger 57 against its brush 46 thereby urging the brush against its collector ring. For placing the tension on the spring 61 and for varying this tension, each pin 59 has a handle or adjusting arm 62 secured to one of the ends thereof which projects beyond the adjacent extension 60. The handle 62 may be selectively engaged with any one of the notches 63' formed in a flange 63 integral with one of the associated extensions 60. The brackets 50 are constituted of material that is a good conductor of electricity and they have extensions 64 on which terminals or binding posts 65 are mounted. Each terminal or binding post 65 is electrically connected to one end of a flexible conductor 66, the other end of which is imbedded in the adjacent brush 46. The binding posts 65 are also connected to flexible conductors 67 which extend from the binding posts to the terminals of the motor 7 as shown in Figure 9. Preferably the conductors 67 are incorporated in a flexible cable. To provide for the convenient mounting of the brush assembly on the bearing collar 21 the posts 51 are fastened by nuts 70 to an attaching plate 71 and this attaching plate 71 is suspended on or secured to the bearing collar 21 by means of one or more bolts and nuts 72 secured to the plates 71 and to one or more lugs 73 provided on the bearing collar.

With this arrangement the brush assembly is carried by a part, that is, the bearing collar 21, which rotates with the revolving platform and relative to the truck 1 but which does not tilt or tip relative to the truck. The brushes are designed to rotate relative to the collector rings without impairing the transmission of the current between these parts and as they are not subjected to tipping or rocking they always appropriately engage the rings and serve to transmit the current without sparking, pitting or other undesirable action. It is true that the platform 2 rocks or tips slightly with respect to the collar 21 and consequently also with respect to the brush assembly, but this slight tipping is taken up by the flexible conductor or cable between the brush assembly and the motor and as it is only slight it does not in any way injure or impair this conductor.

The invention claimed is:

1. In a machine of the character described, a truck, a revolving platform supported on said truck for turning movement, a member interconnected with the revolving platform for rotary movement in a horizontal plane but constrained against tipping or rocking while leaving the platform free to tip or rock, collector rings mounted on the truck and brushes mounted on said member and coacting with said collector rings.

2. A machine of the character described comprising a truck, a revolvable platform supported on the truck for turning movement, a gudgeon pin arrangement for tying the platform to the truck at the axis of rotation while leaving the platform free to rotate, a bearing collar fitted on the gudgeon pin arrangement, trunnions connecting diametrically opposite points of the collar to the platform and coacting collector ring and brush members, one of which is mounted on the collar and the other of which is mounted on the truck.

3. In a machine of the character described, a truck, a revolving platform supported on said truck for turning movement, a member interconnected with the platform for rotary movement in a horizontal plane therewith, but constrained against tipping or rocking while leaving the platform free to tip or rock, and electric power transmission means including a part mounted on the truck and a coacting part supported on said member.

4. In a machine of the character described having a truck, a revolving platform supported on said truck for turning movement and an electric motor carried by the platform and adapted to actuate the instrumentalities of the machine, means for transmitting electrical power to the electric motor and including collector rings supported on the truck, brushes coacting with the collector rings and connected to the motor and means for supporting the brushes and including a member interconnected with the revolving platform for rotary movement in a horizontal plane, but constrained against tipping or rocking while leaving the platform free to tip or rock.

5. In a machine of the character described having a truck, a revolving platform supported on said truck for turning movement and an electric motor carried by the platform and adapted to actuate the instrumentalities of the machine, means for transmitting electric power to the electric motor and including collector rings supported on the truck, brushes coacting with the collector rings and connected to the motor, a mounting for said brushes, a member connected to and supporting said mounting, pivotal connections between the member and the revolving platform to permit the platform to tilt or rock relative to the member and means constraining the member to rotate in a horizontal plane about the axis of rotation of the platform.

6. In a machine of the character described having a truck, a revolving platform supported on said truck for turning movement and an electric motor carried by the truck and adapted to actuate the instrumentalities of the machine, means for transmitting electric current to said motor and including a mounting sleeve supported on the truck, collector rings secured to said sleeve and adapted for connection with a source of current supply, brushes coacting with said collector rings and having flexible conductors connected thereto and leading to and connected with the flexible motor and a member supporting said brushes and interconnected with the revolving platform for rotary movement in a horizontal plane, but constrained against tipping or rocking while leaving the platform free to tip or rock.

7. In a machine of the character described having a truck, a revolving platform supported on said truck for turning movement and an electric motor carried by the platform and adapted to actuate the instrumentalities of the machine, means for transmitting electric current to the motor and including collector rings mounted on the truck and adapted for connection to a source of current supply, brushes coacting with collector rings, flexible connections between the brushes and the motor, a mounting having guides supporting the brushes for sliding movement and tensioning devices for urging the brushes into engagement with the collector rings, a member supporting said brush mounting, pivotal connections between the member and the revolving platform permitting the revolving platform to tip or rock relative to said member and means constraining the member to rotary movement about the axis of rotation of the platform.

8. In a machine of the character described, a truck, a platform supported on the truck for revolving movement, a tie member at the axis of rotation of the platform on the truck and having means interconnecting it with the truck, a bearing collar constrained to rotate on the tie member and limited in its upward movement with respect thereto, pivotal connections between the collar and the platform, and electric power transmission means including coacting parts mounted on the truck and collar respectively.

In witness whereof, we hereto affix our signatures.

GEORGE J. LEXA.
ROLF LJUNGKULL.